US012596967B2

(12) United States Patent
    Fagerland

(10) Patent No.:    US 12,596,967 B2
(45) Date of Patent:      Apr. 7, 2026

---

(54) METHOD AND SYSTEM FOR PICKING PRODUCTS IN A PICKING STATION OF AN AUTOMATIC STORAGE AND RETRIEVAL SYSTEM

(71) Applicant: Autostore Technology AS, Nedre Vats (NO)

(72) Inventor: Ingvar Fagerland, Kolnes (NO)

(73) Assignee: AutoStore Technology AS, Nedre Vats (NO)

( * ) Notice: Subject to any disclaimer, the term of this patent is extended or adjusted under 35 U.S.C. 154(b) by 451 days.

(21) Appl. No.: 18/042,425

(22) PCT Filed: Aug. 31, 2021

(86) PCT No.: PCT/EP2021/073981
§ 371 (c)(1),
(2) Date: Feb. 21, 2023

(87) PCT Pub. No.: WO2022/043573
PCT Pub. Date: Mar. 3, 2022

(65) Prior Publication Data
US 2023/0359950 A1     Nov. 9, 2023

(30) Foreign Application Priority Data

Aug. 31, 2020    (NO) .................................... 20200943

(51) Int. Cl.
   *G06Q 10/047*      (2023.01)
   *B65G 1/137*      (2006.01)
             (Continued)

(52) U.S. Cl.
   CPC ......... *G06Q 10/047* (2013.01); *B65G 1/1378* (2013.01); *B65G 47/90* (2013.01); *G06Q 10/087* (2013.01)

(58) Field of Classification Search
   CPC .... G06Q 10/047; G06Q 10/087; G06Q 10/08; B65G 1/1378; B65G 47/90;
            (Continued)

(56) References Cited

U.S. PATENT DOCUMENTS

| | | |
|---|---|---|
| 9,751,693 B1 | 9/2017 | Battles et al. |
| 2007/0187183 A1 | 8/2007 | Saigh et al. |

(Continued)

FOREIGN PATENT DOCUMENTS

| | | |
|---|---|---|
| AT | 509950 A1 | 12/2011 |
| CN | 105473469 A | 4/2016 |

(Continued)

OTHER PUBLICATIONS

International Search Report issued in corresponding International Application No. PCT/EP2021/073981, mailed on Jan. 4, 2022 (7 pages).

(Continued)

*Primary Examiner* — Florian M Zeender
*Assistant Examiner* — Kimberly S. Bursum
(74) *Attorney, Agent, or Firm* — Baker Botts L.L.P.

(57)        ABSTRACT

A method picks products from at least one storage container in a picking zone of a picking station of an automated storage and retrieval system. The picking is controlled by a picking system controller communicating with a warehouse management system, WMS. The picking is performed by a picking device in the picking zone by placing picked products in one or more consolidation containers according to orders. The picking system controller is adapted for controlling the picking device and picking station for executing the method. The method includes a) receiving and ranking product orders in the warehouse management system, b) moving, by means of a transport system, storage containers (Continued)

with ordered products towards the picking zone according to the ranking of product orders, and c) checking which storage containers are available and ready to be picked from in the picking station and which storage containers and consolidation containers will be available within a timeframe, as well as determining a current position of the picking device relative to the positions of the at least one storage container that are ready to be picked from and the consolidation containers that are ready to receive the picked products. The method further includes d) establishing different picking sequences for completing each product order from the ranked product orders. Each picking sequence lists the products to be picked from the storage containers and which consolidation containers to place the products in within the timeframe. Each picking sequence is established by estimating the following: shortest travel distance for moving the picking device for picking from one storage container to picking from another storage container; fastest completion of picking from storage containers in the picking station for enabling new storage containers to enter the picking zone of the picking station; and fastest completion of the consolidation containers for replacing with new consolidation containers. The method further includes e) ranking the picking sequences and selecting the picking sequence providing higher throughput of picked products according to ranked product orders; f) executing picking of products by letting the picking system controller control the picking device to pick products from the storage containers and place them within the consolidation containers according to the selected picking sequence within the timeframe; and g) repeating steps a) to f) above.

14 Claims, 4 Drawing Sheets

(51) Int. Cl.
  *B65G 47/90* (2006.01)
  *G06Q 10/087* (2023.01)
(58) Field of Classification Search
  CPC .............. B65G 2209/08; B65G 1/0464; B65G 2209/02; B65G 2209/10; B65G 1/137; B65G 1/1373
See application file for complete search history.

(56) References Cited

U.S. PATENT DOCUMENTS

| | | | |
|---|---|---|---|
| 2009/0081008 A1 | 3/2009 | Somin et al. | |
| 2018/0218469 A1 | 8/2018 | Lert, Jr. et al. | |
| 2019/0129371 A1 | 5/2019 | Wagner et al. | |
| 2019/0152703 A1 | 5/2019 | Sellner et al. | |
| 2019/0205825 A1 | 7/2019 | Lindbo | |
| 2019/0233213 A1 | 8/2019 | Phan-Quiroga et al. | |
| 2020/0130936 A1 | 4/2020 | Shekhawat et al. | |
| 2024/0336434 A1* | 10/2024 | Douglas | B65G 1/1378 |

FOREIGN PATENT DOCUMENTS

| | | | | |
|---|---|---|---|---|
| CN | 106064734 A | 11/2016 | | |
| CN | 110065751 A | 7/2019 | | |
| EP | 3 166 876 A1 | 5/2017 | | |
| EP | 3 182 348 A1 | 6/2017 | | |
| GB | 2514930 A | 12/2014 | | |
| NO | 20191511 A1 | 6/2021 | | |
| WO | 2014/025270 A1 | 2/2014 | | |
| WO | 2014/090684 A1 | 6/2014 | | |
| WO | 2015/193278 A1 | 12/2015 | | |
| WO | 2016/007940 A1 | 1/2016 | | |
| WO | 2019/223593 A1 | 11/2019 | | |
| WO | 2019/238641 A1 | 12/2019 | | |
| WO | WO-2019232613 A1* | 12/2019 | .......... | B65G 1/0492 |
| WO | 2020/067907 A1 | 4/2020 | | |

OTHER PUBLICATIONS

Written Opinion issued in corresponding International Application No. PCT/EP2021/073981, mailed on Jan. 4, 2022 (8 pages).
Search Report issued in corresponding Norwegian Application No. 20200943, mailed on Mar. 30, 2021 (3 pages).
Qiu Dongli; Shi Jingjing; Overview of Storage Control Scheduling Algorithms Oriented to System Throughput and Fairness; Computer Applications and Software, Issue 05, dated May 15, 2017, pp. 279-284.
Yang Fan, First Office Action for Chinese Patent Application No. 2021800533451, dated Apr. 7, 2025, 11 pages, pub. by SIPO, Beijing, China.

\* cited by examiner

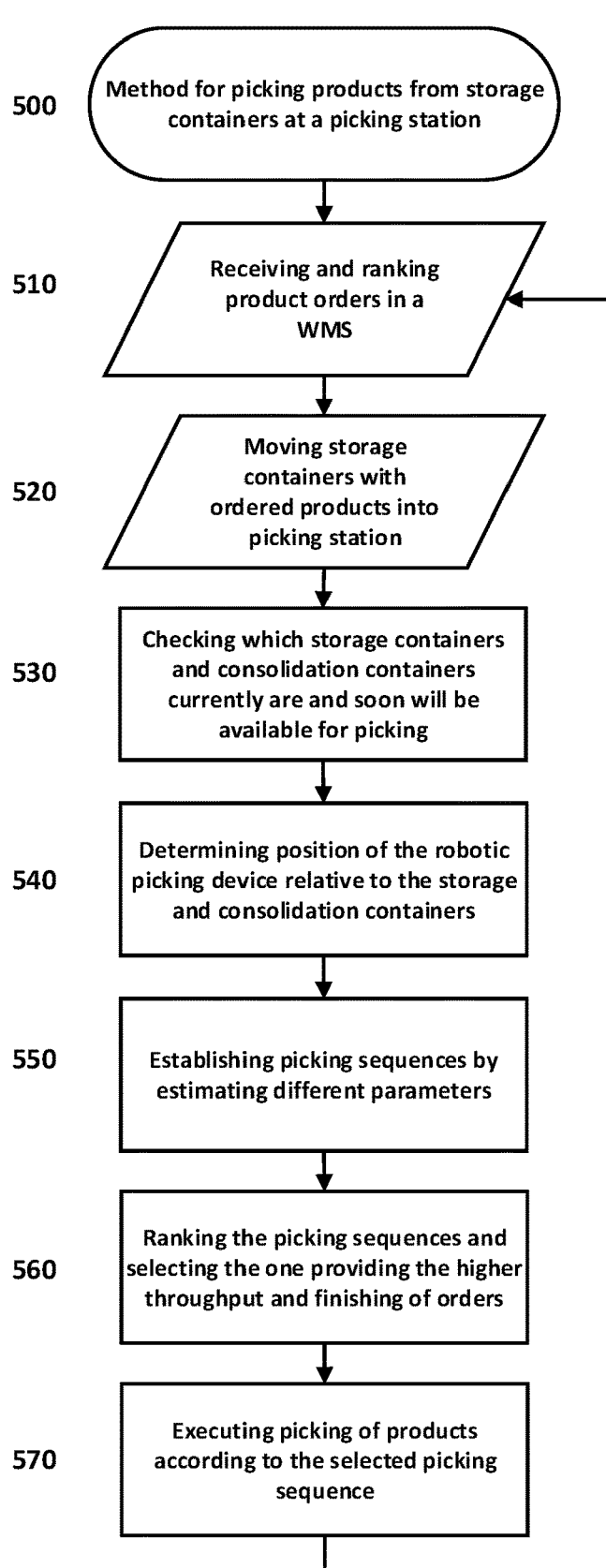

500 — Method for picking products from storage containers at a picking station

510 — Receiving and ranking product orders in a WMS

520 — Moving storage containers with ordered products into picking station

530 — Checking which storage containers and consolidation containers currently are and soon will be available for picking 540 — Determining position of the robotic picking device relative to the storage and consolidation containers 550 — Establishing picking sequences by estimating different parameters 560 — Ranking the picking sequences and selecting the one providing the higher throughput and finishing of orders 570 — Executing picking of products according to the selected picking sequence

Fig. 5

METHOD AND SYSTEM FOR PICKING PRODUCTS IN A PICKING STATION OF AN AUTOMATIC STORAGE AND RETRIEVAL SYSTEM

FIELD OF THE INVENTION

The present invention relates to an automated storage and retrieval system for storage containers, and more specifically to a method, system and computer program for picking items from storage containers and putting items into consolidation containers in a picking station of the automated storage and retrieval system.

BACKGROUND

FIG. 1 discloses a typical prior art automated storage and retrieval system 1 with a framework structure 100 and with container handling vehicles 201, also known as robots, operating on the system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 further comprises a rail system 108 arranged across the top of the framework structure 100, on which rail system 108 a plurality of container handling vehicles 201 are operated to raise storage containers 106 from, and lower storage containers 106 into, the storage columns 105, and also to transport the storage containers 106 above the storage columns 105.

The rail system 108 comprises a first set of parallel rails 110 arranged to guide movement of the container handling vehicles 201 in a first direction X across the top of the frame structure 100, and a second set of parallel rails 111 arranged perpendicular to the first set of rails 110 to guide movement of the container handling vehicles 201 in a second direction Y which is perpendicular to the first direction X. Also shown in FIG. 1 is a first rail in a first direction X, 110a, a second rail in a first direction X, 110b, a first rail in a second direction Y, 111a and a second rail in a second direction Y, 111b. The container handling vehicles 201 move laterally above the storage columns 105, i.e. in a plane which is parallel to the horizontal X-Y plane.

The type of container handling vehicle 201 used can be any known in the art, e.g. one of the automated container handling vehicles disclosed in WO2014/090684A1 or in WO2015/193278A1 having a footprint covering one or two storage columns 105. The rail system 108 can be arranged as single- and/or double-track configurations.

Storage containers 106 are stored in the columns 105 which define a third direction Z which is orthogonal to the first direction X and the second direction Y. The storage containers 106 are accessed by the container handling vehicles 201 through access openings 112 in the rail system 108, i.e. the rail system 108 is arranged on the framework structure 100 defining the circumference of each access opening 112 on top of each storage column 105. The upright members 102 of the framework structure 100 may be used to guide the storage containers when these out from and lowering of the containers into the columns 105. The stacks 107 of containers 106 are typically self-supportive.

The storage volume of the framework structure 100 has often been referred to as a storage grid 104, where the possible storage positions within storage columns 105 in this storage grid 104 is referred to as a storage cell. Each storage column 105 may be identified by a position in an X- and Y-direction, while each storage cell may be identified by a container number in the X, Y and Z-direction.

In the framework structure 100, most of the columns 105 are storage columns 105, i.e. columns 105 where storage containers 106 are stored in stacks 107. However, some columns 105 may have other purposes such as letting storage containers 106 be transferred from the upper side the lower side of the storage grid 104 or vice versa.

In FIG. 1, columns 119 and 120 are special-purpose columns used by the container handling vehicles 201 to drop off and/or pick up storage containers 106 so that they can be transferred to an access station, e.g. a picking station (not shown), where the storage containers 106 can be accessed from outside of the framework structure 100 or transferred out of or into the framework structure 100. An access station is typically a picking station where product items are picked from storage containers 106 and placed in consolidation containers.

Within the art, columns for transferring a storage container in and out of the storage system is normally referred to as port column 119, 120 or a transfer column. A storage container is transferred to and from a port column 119, 120 via ports 119', 120' typically located at an opening at an end of the port column 119, 120. i.e. where storage containers are entering or exiting the port columns 119, 120. A port may also be located at other locations such as at a mid-level or ground level of a port column 119, 120.

Transportation and transferring of storage container 106 to an access station may be in any direction, that is horizontal, tilted and/or vertical. For example, the storage containers 106 may be placed in a random or dedicated column 105 within the framework structure 100, then picked up by any container handling vehicle 201 and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201 can drop off storage containers 106 to be transported to a picking station, and the second port column 120 may be a dedicated pick-up port column where the container handling vehicles 201 can pick up storage containers 106 for storing.

When operating an automated storage and retrieval system 1, each container handling vehicle 201 is given a task by receiving instructions. A task may for instance be to retrieve a specific storage container 106 from a storage column 105 and deliver it at a port column 119 for further transport to an access station or to move a storage container 106 from one storage cell to another. This means that each container handling vehicle 201 is instructed to follow a set route on the rails 111 from its current location to a target location.

When a specific storage container 106 stored in one of the columns 105 disclosed in FIG. 1 is to be retrieved, one of the container handling vehicles 201 is assigned the task and instructed to retrieve the storage container 106 from its location and transport it to the port 119' of the port column 119. This operation involves moving the container handling vehicle 201 to a location above the storage column 105 in which the storage container 106 is located, retrieving the storage container 106 from the storage column 105 using a lifting device (not shown) of the container handling vehicle 201 and transporting the storage container 106 to the port 119' of the port column 119.

If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as digging within the art, may be performed with the same container handling vehicle 201 that is subsequently used for transporting the target storage container to the drop-off port column 119, or with one or a plurality of other cooperating container handling vehicles 201. Alternatively, or in addition, the automated storage and retrieval system 1 may have container handling vehicles 201 specifically dedicated to the task of temporarily removing storage containers from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201 is instructed to pick up the storage container 106 from the port 120' of the port column 120 transferring storage containers from an access or a transfer station and transport it to a location above the storage column 105 where it is to be stored. After any storage containers positioned at or above the target position within the storage column stack 107 have been removed, the container handling vehicle 201 positions the storage container 106 at the desired position. The removed storage containers 106 may then be lowered back into the storage column 105 or relocated to other storage columns.

Locations of each storage container 106 within the framework structure 100 and corresponding access station, such as a picking station, and locations and movements of each container handling vehicle 201 operating on the storage and retrieval system are continuously monitored and controlled by a control system of the Automated Storage and Retrieval System, i.e. an ASRS control system. Products stored in each storage container 106 is kept updated by a warehouse management system. In this way a desired storage container 106 can be delivered to a specified access station at a desired time without the container handling vehicles 201 colliding with each other.

An automated storage and retrieval system 1 is typically operated by a plurality of container handling vehicles 201 transferring storage containers from one location to another. Larger storage and retrieval system can be populated with several hundred container handling vehicles 201 where each is assigned and given a task by receiving instructions transmitted via a communication module 500 of the ASRS control system. A task may for instance be to get a specific storage container 106 from a storage column 105 where it is located, follow a route by driving a set distance in a set directions, deliver a storage container 106 at the port 119' for further transport to a picking station.

A conveyor system comprising conveyors and/or a track system can be used to transport storage containers 106 between a port 119' of the automated storage and retrieval system 1 and a picking station.

Delivery vehicles can be arranged to receive a storage container from above when placed below transfer columns and transport storage containers to a picking station.

Picking of products from storage containers 106 in a picking station can be performed manually by one or more persons and/or automatically by one or more robotic picking devices. A robotic picking device may be a gantry-mounted robot or an industrial robot. The robotic picking device may be separate from the delivery vehicle carrying the storage container and operating independently. The system may in this embodiment comprise a section of a rail-based delivery system with perpendicular tracks in X and Y direction for supporting delivery vehicles carrying containers accessible from above. The delivery vehicle is freely movable in the X and Y directions on the delivery system within the picking station, making products in storage containers accessible for picking as shown in NO 20191511.

Instead of delivery vehicles operating on a delivery rail system, the picking system may comprise a conveyor arrangement for transferring containers into the picking station. The conveyor arrangement can be arranged in different heights and be presented for the robotic picking device in a multilevel conveyor arrangement. In yet another alternative, instead of delivery vehicles and/or conveyors, the storage containers can be delivered to the picking station by prior art container handling vehicle(s) comprising a lifting device for transportation of storage containers, e.g. raising a storage container from, and lowering a storage container into, a storage column, as well as horizontal transport of the storage container into a picking station. The picking station may comprise rails in the X and Y directions which are flush with the rails in the X and Y directions of the storage and retrieval system such that the container handling vehicles can enter the picking station on the same rail system. The container handling vehicle may in this alternative drop the storage container to a position within the picking station, which is below the rail system such that the robotic picking device can access the contents of the storage container.

The picking system may further comprise a conveyor for transferring containers out from the picking station.

Products to be picked arrives the picking station in storage containers 106 according to orders. An order typically comprises a listing of different products that are stored in different storage containers 106. How picking is performed in a picking station, i.e. from which storage container 106 and in what order will determine how fast and efficient picking of orders can be performed.

US 2018/218469 A1 describes a system for picking goods, and more specifically a system and method for providing proxy picking of non-fungible goods within an automated storage and retrieval system, which repurposes one or more automated mobile robots operating within the automated inventory management system to perform a plurality of tasks across multiple different areas of an automated store. The proxy picking system and method are configured to pick individually identified non-fungible goods according to a customer selection on an ordering screen based on measured attributes and images of the goods, the attributes selected by the customer.

The present invention describes a method and picking system providing optimal through-put of ordered products through a picking station operated by a robotic picking device. This is achieved by determining which products to pick from which storage containers and in which order as well as which consolidation containers to place the products in.

SUMMARY OF THE INVENTION

The present invention is set forth and characterized in the independent claims, while the dependent claims describe other characteristics of the invention.

The invention addresses controlling of a picking device at a picking station for picking of products stored in storage containers of an automated storage and retrieval system. Storage containers to be picked from are transported from the automated storage and retrieval system to the picking station. The picking station is controlled by a picking system controller.

The picking station comprises an area divided into sub-areas including a picking zone. The picking zones are positions for storage containers to pick products from and positions for containers to place products in. Containers used for placing picked products are typically called consolidation containers.

More specifically the invention describes a method for increasing throughput of ordered products picked from storage containers according to product orders by determining the fastest and most efficient way of picking products.

The method is defined by picking products from at least one storage container in a picking zone of a picking station of an automated storage and retrieval system, where picking is controlled by a picking system controller communicating with a warehouse management system and where picking is performed by a picking device in the picking zone by placing picked products in one or more consolidation containers according to orders. The picking system controller is adapted for controlling the picking device and picking station for executing the method comprising of:

a) receiving and ranking product orders in the warehouse management system, b) moving, by means of a transport system, storage containers with ordered products towards the picking zone according to the ranking of product orders;

c) checking which storage containers are available and ready to be picked from in the picking station and which storage containers and consolidation containers will be available within a timeframe, as well as determining a current position of the picking device relative to the positions of the at least one storage container that are ready to be picked from and the consolidation containers that are ready to receive the picked products;

d) establishing different picking sequences for completing each product order from the ranked product orders, each picking sequence listing the products to be picked from the storage containers and which consolidation containers to place the products in within the time-frame, where each picking sequence is established by estimating the following:

shortest travel distance for moving the picking device for picking from one storage container to picking from another storage container;

fastest completion of picking products from storage containers in the picking station for enabling new storage containers to enter the picking zone of the picking station;

fastest completion of the consolidation containers for replacing with new consolidation containers;

e) ranking the picking sequences and selecting the picking sequence providing highest throughput of picked products according to ranked product orders;

f) executing picking of products by letting the picking system controller control the picking device to pick products from the storage containers and place them within the consolidation containers according to the selected picking sequence within the timeframe;

g) repeating steps a) to f) above.

According to the steps above, the established picking sequences will have different execution times, since the picking device will have different moving patterns to and from storage containers and consolidation containers depending on their positions in the picking area of the picking station as well as when products in listed in product orders are ready to be picked in the picking station.

According to one embodiment of the method, product orders with high priority are ranked higher than other orders.

According to one embodiment of the method, the picking sequence is further established by estimating arrival time of next storage container entering the picking station and its position in the picking station. The next storage container entering the picking station may for instance store products needed for completing picking of an order.

According to another embodiment of the method, the picking sequence is further established by checking if there are identical products listed in different product orders for picking identical products successively.

According to one embodiment of the method, the picking sequence is further established by checking if different products listed in product orders are stored in storage containers positioned close to each other in the picking zone.

According to another embodiment of the method, the picking sequence is further established by prioritizing completion of product orders with only a few remaining products to be picked.

According to another embodiment of the method, the picking sequence is further established by estimating arrival time of next storage container to enter the picking zone and its position in the picking zone.

According to one embodiment of the method, picking from storage containers with few products left is completed in preference to picking from storage containers with more products to allow new storage containers to enter the picking station. This will increase the throughput of storage containers in the picking station.

According to an embodiment of the method, buffer containers are used for temporary storing products from storage containers with few products left for faster replacements of storage containers. Buffer containers are placed such that they are accessible for the picking device.

According to an embodiment of the method, camera vision is used for determining positions of products in the picking area. This is used for identifying a position of a specific product in a specific storage container and precisely controlling the picking device to pick the product in the storage container and place it in a specific consolidation container.

According to an embodiment of the method, positions of storage containers and/or consolidation containers in the picking station are rearranged for providing minimal travel distance for the picking device. This is especially advantageous when for instance one or more storage containers comprise several products listed in orders. By placing the storage containers close to each other, the elapsed time for completing picking of products according to orders will be reduced.

The invention is further defined by a picking station of an automated storage and retrieval system, where the picking station is controlled by a picking system controller communicating with a warehouse management system and where picking is performed by a picking device placing picked products in one or more consolidation containers according to orders, wherein the picking system controller is adapted for controlling the picking device and picking station for executing the method described above.

The invention is further defined by a computer program product that when executed by a processor in a picking system controller, controlling a picking station of an automated storage and retrieval system, performs picking of products from storage containers according to the method described above.

BRIEF DESCRIPTION OF THE DRAWINGS

The following drawings are appended to facilitate the understanding of the invention. The drawings show embodiments of the invention, which will now be described by way of example only, where:

FIG. 5 is flowchart illustrating the different steps of the picking method.

LIST OF REFERENCE NUMBERS

Figure 1:
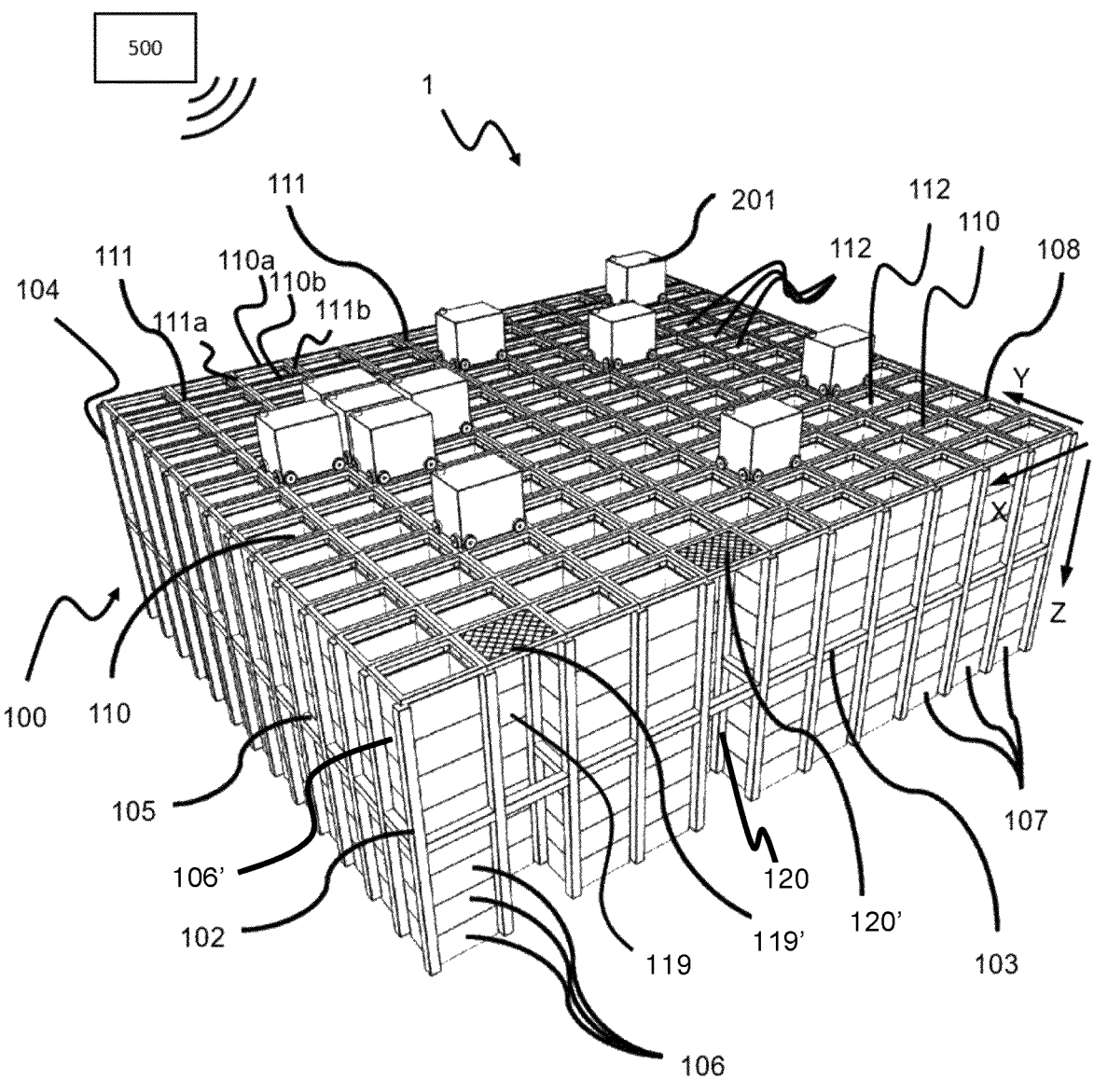
FIG. 1 is a perspective view of a framework structure of a prior art automated storage and retrieval system.

1—Automated storage and retrieval system
100—Framework structure
102—Upright members of framework structure
103—Horizontal members of framework structure
104—Storage grid
105—Storage column
106—Storage container
106'—Position of storage container
107—Stack
108—Top Rail system
110—Parallel rails in first direction (X)
110*a*—First rail in first direction (X)
110*b* Second rail in first direction (X)
111—Parallel rail in second direction (Y)
111*a*—First rail of second direction (Y)
111*b*—Second rail of second direction (Y)
112—Access opening
119—First port column
119'—First port
120—Second port column
120'—Second port
201 Container handling vehicle
400—Picking system
401—Picking system controller (PSC)
402—Warehouse management system (WMS)
403—Automated Storage and Retrieval System (ASRS)
405—Picking device
407 Vision system
40—Container contents handling position
410—Picking station
411—Upper conveyor
412—Lower conveyor
413—Gantry for robotic picking device
414—Gantry for camera
415—Protective cover
419—Picking station protective cover 425—Mezzanine
500—Control system
X—First direction
Y—Second direction
Z—Third direction

DETAILED DESCRIPTION OF THE INVENTION

In the following description, the invention will be explained in more detail by way of example only and with reference to the appended drawings. It should be understood, however, that the drawings are not intended to limit the invention to the 5 subject-matter depicted in the drawings.

A typical prior art automated storage and retrieval system 1 with a framework structure 100 was described in the background section above with reference to FIG. 1.

The framework structure 100 can be of any size, and it is understood that it can be considerably wider and/or longer and/or deeper than the one disclosed in FIG. 1. For example, the framework structure 100 may have a horizontal extent of more than 700×700 storage columns 105 and a storage depth for storing more than eight stacked storage containers 106, and where storage containers 106 are handled by hundreds of container handling vehicles 201 running on the rail system 108.

Also, the storage grid 104 can be considerably deeper than disclosed in FIG. 1. For example, the storage grid 104 may be more than eight grid cells 122 deep, i.e. in the Z direction indicated in FIG. 1.

Figure 2:
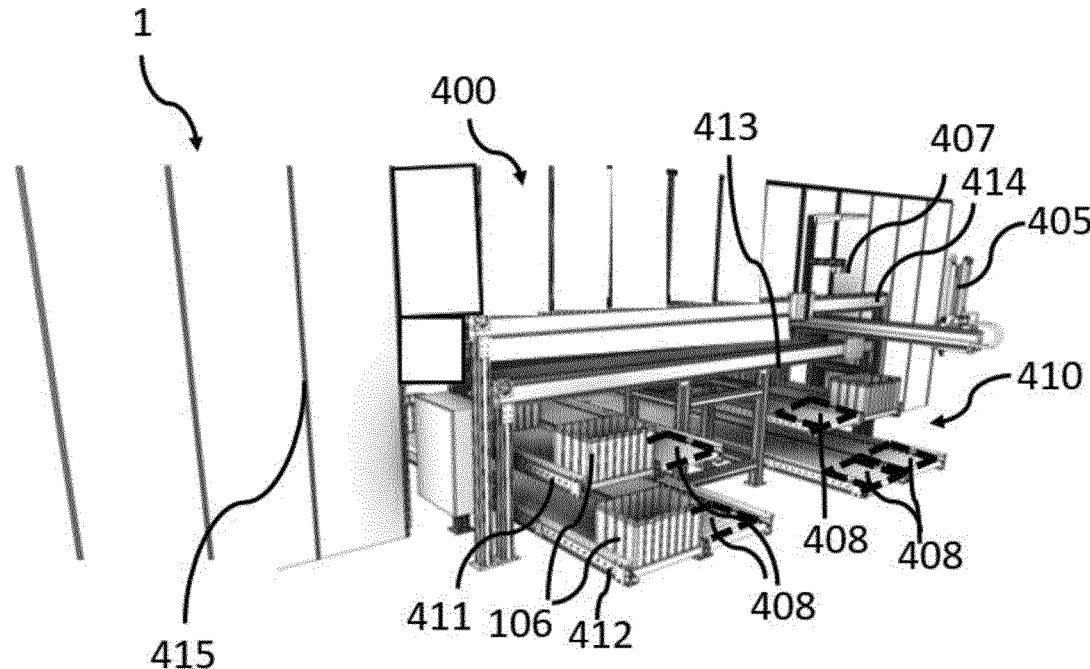
FIG. 2 shows an example of a picking system arranged on a ground floor, where the picking station comprises a double deck conveyor for moving containers.

FIG. 2 shows an example of a picking system 400 comprising a picking station 410 arranged on a ground floor, i.e. at the lower part of a connected automated storage and retrieval system 1, and where the picking station 410 comprises a double deck conveyor 411,412 for bringing storage containers 106 into and out of the picking station 410. The picking station 410 comprises a picking zone where storage and consolidation containers are within reach of one or more picking devices 405.

In this example, there is a total of eight container contents handling positions 408 on the conveyors 411,412 of the picking station 410. Storage containers 106 are shown occupying three of the container contents handling positions 408, whereas the remaining five container contents handling positions 408 on the conveyors 411,412 are unoccupied.

In the disclosed embodiment, the picking station 410 comprises double deck conveyors 411,412 for bringing storage containers 106 between positions within the automated storage and retrieval system 1 and the container handling positions 408. The double deck conveyors 411,412 are shown as an upper and lower conveyor 411,412. The lower conveyors 412 extend at a picking end a distance at least equal to the size of one storage container 106 relative the upper conveyors 411. Similarly, although not shown on the figure, in order to be able to put storage containers 106 onto, and retrieve storage containers 106 from, the conveyors 411, 412, the lower conveyors 412 extend at a loading end a distance at least equal to the size of one storage container 106 relative the upper conveyors 411 on the opposite ends of the conveyors 411,412. In the disclosed example the robotic picking device 405 is arranged on a gantry arrangement 413 and the camera 407 is movably arranged on a separate gantry 414 above the gantry arrangement 413 for the robotic picking device 405. While a gantry arrangement 413 is described here, other mechanisms that can move a camera around above the storage containers being picked are also envisaged.

In operation, the container contents handling positions 408 on the upper conveyors 411 may be for picking, whereas the container contents handling positions 408 on the lower conveyors 412 may be for consolidating picking orders. However, the setup of which of the container contents handling positions 408 used for picking and consolidation, respectively, may vary dependent on different demands. For example, if it is required to use more of the container contents handling positions 408 for picking or consolidation, this may easily be arranged. While the exemplary embodiment comprises eight conveyors, 411,412, other arrangements for transporting the storage containers 106 to and away from the picking device 405 are envisaged.

Protective panels 415 may be employed to provide a physical barrier to the storage and retrieval system 1 such that an operator may safely perform manual repair or maintenance in the picking station 410.

Figure 3:
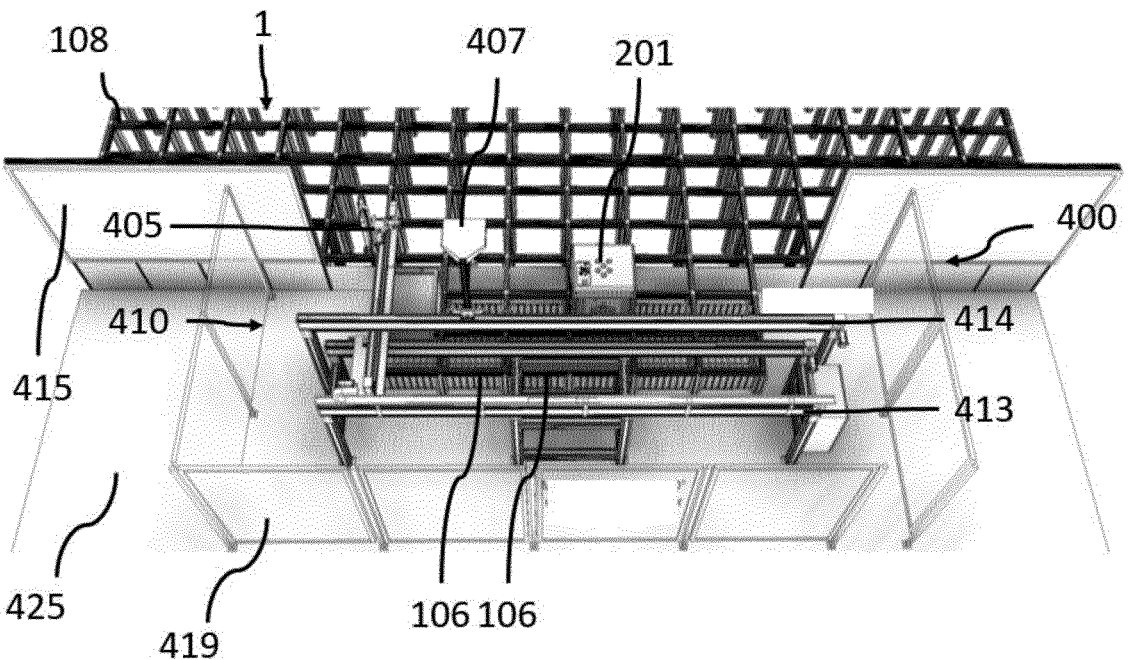
FIG. 3 shows an exemplary picking system arranged on a mezzanine, where the picking station comprises a rail system for moving containers.

FIG. 3 shows another example of a picking system which is arranged on a mezzanine 425. The picking station 410 comprises a rail system for moving storage containers 106. The rail system in the picking station 410 is flush with the top rail system 108 of an automated storage and retrieval system 1 where the container handling vehicles 201 operate, such that the container handling vehicles can transport the storage containers 106 from the automated storage and retrieval system 1 directly to stationary container contents handling positions arranged at a level below the rail system of the picking station. In this example, a container handling vehicle 201 is disclosed within the picking station 410 delivering and/or picking up a storage container 108 from a container contents handling position below the rail system 108, such that the robotic picking device 405 can access the contents of the storage container 106. A camera 407 and robotic picking device 405 are disclosed as being mounted on a gantry 414, 413, respectively. The camera 407 is movable and can produce an image of the content of storage containers 106 placed at any of the container contents handling positions 408 in the picking station 410.

In order to increase safety for any operator, picking station protective covers 419 can be arranged around the exterior of the picking station 410 as well as protective panels 415.

Figure 4:
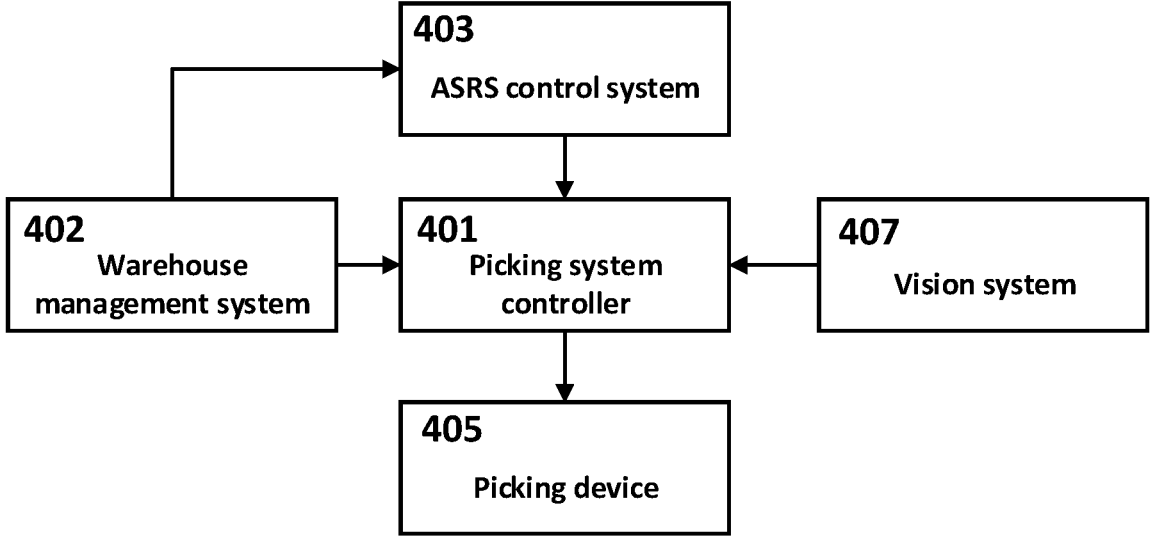
FIG. 4 illustrates a picking system controller of a picking device and connected systems.

FIG. 4 illustrates a picking system controller 401 of a picking device 405 and connected systems. A picking station 410 is controlled by the picking system controller 401 which is connected to the picking device 405 for controlling the picking device 405. The picking system controller 401 is further connected to a control system of the automated storage and retrieval system, i.e. ASRS control system 403, and a warehouse management system (WMS) 402 for exchanging information related to storage containers entering the picking station and products to be picked.

For larger storage and retrieval systems 1, high order activity is expected and conveyance of storage containers 106 to be picked from in a picking station 410 will be performed at a high rate. To avoid queueing at the picking station it is important to perform picking in an optimal way to achieve a high throughput of containers, i.e. both storage containers 106 and consolidation containers.

FIG. 5 is flowchart illustrating the different steps of the picking method 500 according to an embodiment of the invention for picking products from at least one storage container 106 in a picking station 410 comprising a picking zone of an automated storage and retrieval system 1. Picking is controlled by a picking system controller 401 communicating with a warehouse management system, WMS, 402 and where picking is performed by a picking device 405 in the picking zone by placing picked products in one or more consolidation containers according to orders. The picking system controller 401 is adapted for controlling the picking device 405 and picking station 410 according to the inventive method.

Completed consolidation container will be moved from the picking station to another area where its content is further treated, e.g. sorted and prepared for shipping.

The first step 510 of the method is receiving and ranking product orders in the warehouse management system 402. An order typically comprises a listing of several different products to be shipped to a recipient after being picked and placed together in one or more consolidation containers.

Ranking of orders is normally performed according to time received and/or according to priority of orders. The purpose of the ranking is to determine which storage containers 106 to first transfer to the picking station 410. Normally orders are handled, ranked and effectuated continuously as they are received. However, if an order is flagged with a high priority, it may be ranked and effectuated first.

The next step 520 is moving storage containers 106 with ordered products to the picking station 410 and into the picking zone according to the ranking. This is performed by a transport system bringing the storage containers to the picking device 405. As mentioned above, moving of storage containers 106 between the automated storage and retrieval system 1 and the picking station 210 can be performed by conveyors and/or by container handling vehicles 201 shown as examples in FIGS. 2 and 3.

Other means for moving of storage containers 106 between the automated storage and retrieval system 1 and the picking station 210 can be envisaged such as for instance rotating carousel devices or specialized delivery vehicles. Delivery vehicles can move freely on a rail system arranged below the automatic storage and retrieval system 1. The same rail system will in this embodiment run from the automatic storage and retrieval system 1, e.g. from a location below a delivery column of the automatic storage and retrieval system 1 and into a picking station 410, thereby making a part of the picking station 410. By having a similar configured rail system in the picking station as the one previously described, i.e. the rail system 108 arranged across the top of the framework structure 100, the positions of the delivery vehicles, and thus the storage containers, can easily be rearranged on the rail system within the picking station 410.

A transport system combining the above mentioned transfer devices for moving storage containers 106 to the picking station 410 is envisaged, e.g. a storage container 106 is transported from the storage and retrieval system 1 to a conveyor moving the storage container 106 to a rotating carousel before being transferred from the carousel to the picking station 410.

A picking station 410 may have its own transport system, or the transport system within a picking station 410 may be a part of the transport system transporting storage containers 106 from the storage and retrieval system 1 to the picking station 410 such as the conveyors and container handling vehicles 201 shown in FIGS. 2 and 3.

The next step 530 is checking which storage containers 106 are currently available and ready to be picked from in the picking station 410 and which storage containers 106 and consolidation containers will be available within a timeframe, for instance the next 10 seconds, as well as determining 540 a current position of the picking device 405 relative to the positions of the at least one storage container 106 that are ready to be picked from and the consolidation containers that are ready to receive the picked products. The size of a timeframe can be adjusted and set according to size of the storage and retrieval system, number of containers that can be fitted in the picking zone, number of operating picking devices 405 etc.

Detecting and determining which storage containers 106 have arrived in the picking station as well as their positions can be done in several ways. In the case where storage containers 106 are transported into the picking station 210 by the delivery vehicles described above, the position of each delivery vehicle on the rail system within the picking station is known by the control system controlling the delivery vehicles.

When storage containers 106 are transported into the picking station 210, their respective positions can be determined by visual means, e.g. a camera capturing images of the storage containers and their stored products inside the picking station. Captured imaged may be used for optimizing position of containers and assist in optimizing picking of products. Reading an RFID tag that is unique for each storage container 106 can also be done to confirm the identity of containers in the picking station 410.

The next step 550 is establishing different picking sequences for completing each product order from the ranked product orders, where each picking sequence is listing the products to be picked from the storage containers 106 and which consolidation containers to place the products in within the timeframe.

Each picking sequence is established by estimating parameters contributing to efficient picking, e.g. by keeping the picking device 405 in constant operation and letting it have minimal travel distance from one picking operation to another.

A first estimated parameter is shortest travel distance for moving the picking device 405 for picking from one storage container 106 to picking from another storage container 106. As an example, let's say that, in the same timeframe, there are currently several storage containers 106 to pick products from according to product listings in different orders. Two of the orders list several identical products to be picked and placed in respective consolidation containers positioned next to each other. By estimating a picking sequence where it is selected to pick said identical products successively, it is expected that the travel distance for the picking device 407 will be minimal and thus provide efficient picking. The same applies if different products listed in different product orders are stored in storage containers 106 positioned close to each other in the picking zone. These may then be listed successively in the picking sequence.

A second estimated parameter is fastest finalizing of picking products from storage containers 106 in the picking station 410 listed in an order for enabling new storage containers 106 to enter the picking zone. If for instance picking of one or two products remains for completing an order, these products will be prioritized. In addition to freeing up space in the picking station, new consolidation containers can replace the finished consolidation containers containing all products according to the order.

A third estimated parameter is fastest completion of placing orders in consolidation containers for replacing with new consolidation container. If for instance, a consolidation container only needs one or two more products to complete an order, completing placing products in this consolidation container will be completed such that the consolidation container can be replaced with another consolidation container.

The next step 560 of the method is ranking the established picking sequences and prioritizing a picking sequence providing higher throughput of picked products according to ranked product orders. The different picking sequences established from the step above will have different execution times for completing picking of different orders and for completing of picking from storage containers 106 and completing placing products in consolidation containers. These are all factors contributing to the throughput of storage containers and products in the picking station. A first ranked picking sequence will typically be the picking sequence providing the highest throughput.

The last step 570 is executing picking of products by letting the picking system controller 401 control the picking device 405 to pick products from the storage containers 106 and place them within the consolidation containers according to the selected picking sequence within the timeframe.

The steps above are repeated for consecutive timeframes. The effect of the described method is that the picking device 405 will be occupied with picking and having minimal waiting time or time elapsed for moving between different storage containers for completing picking from storage containers 106 and placing products in consolidation containers.

According to one embodiment of the invention the picking sequence is further established by estimating arrival time of next storage container 106 to enter the picking zone and its position in the picking zone. In this way, new picking sequences can be established by including the next storage container 106 prior to its arrival at the picking zone.

According to one embodiment of the invention picking from storage containers 106 with few products left is completed in preference to picking from storage containers 106 with more products to allow new storage containers 106 to enter the picking station 410. If for instance a storage container has only two or three products left, completing picking from this storage container will be completed such that another storage container can take its place.

According to one embodiment of the invention buffer containers are used for temporary storing products from storage containers 106 with few products left for faster replacements of storage containers 106. A buffer container will then typically hold different products not included in orders in the current timeframe.

According to one embodiment of the invention, an image processing system is used for determining where in a specific storage container 106 a product to be picked is placed. A vision system 407 comprising camera vision can be used for determining positions of storage containers and consolidation containers in the picking station as well as positions of products within storage containers 106. Image information is then used as input to the picking system controller 401 controlling the picking device 405.

According to one embodiment of the invention positions of storage containers 106 and/or consolidation containers in the picking station 410 are rearranged for providing minimal travel distance for the picking device 405. As mentioned above, delivery vehicles transporting storage containers 106 can be used for rearranging positions of storage containers 106 in the picking station where they are freely movable in the X and Y directions on the delivery system in the picking station. A conveyor arrangement in the picking stations for rearranging storage containers 106 is also feasible.

The invention is further defined by a computer program product that when executed by a processor in a picking system controller 401 controlling a picking station 410 of an automated storage and retrieval system 1 performs the method described above.

The invention is further defined by a picking station 410 of an automated storage and retrieval system 1, where the picking station 410 is controlled by a picking system controller 401 communicating with a warehouse management system 402 and where picking is performed by a picking device 405 placing picked products in one or more consolidation containers according to orders, wherein the picking system controller 401 is adapted for controlling the picking device 405 and picking station 410 for executing the method according to method described above. Examples of picking stations were described above with reference to FIGS. 2 and 3. The operation of the picking device 405 is controlled by the picking system controller 401 when executing a computer program comprising instructions for performing the method described above.

The positions of storage containers within the picking station can be rearranged. This is advantageous since each position for storage containers in the picking station may require different picking times.

The picking system controller 401 will optimize the operation of the picking device 405 by selecting an optimal sequence of the picking jobs corresponding to the sequence giving minimal total physical distance that the picker needs to move or a minimal calculated weighted transportation cost based on current configuration of the picking station, e.g. number of storage container in the picking station and number of consolidation containers to put products in.

The invention described above provides a total throughput of a picking system that is optimized by dynamically weighting different strategies based on which factor that will be limiting for a picking operation.

In the preceding description, various aspects of operation of a picking station and exampled of picking stations are described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the method and system, which are apparent to persons skilled in the art to which the disclosed subject matter pertains, are deemed to lie within the scope of the present invention.

The invention claimed is:

1. A method of picking products from at least one storage container in a picking zone of a picking station of an automated storage and retrieval system, wherein picking is controlled by a picking system controller communicating with a warehouse management system, WMS, and wherein picking is performed by a picking device in the picking zone by placing picked products in one or more consolidation containers according to orders, wherein the picking system controller is adapted for controlling the picking device and picking station for executing the method comprising:
   a) receiving and ranking product orders in the warehouse management system;
   b) moving, by means of a transport system, storage containers with ordered products towards the picking zone according to the ranking of product orders;
   c) checking which storage containers are available and ready to be picked from in the picking station and which storage containers and consolidation containers will be available within a timeframe, as well as determining a current position of the picking device relative to the positions of the at least one storage container that are ready to be picked from and the consolidation containers that are ready to receive the picked products;
   d) establishing different picking sequences for completing each product order from the ranked product orders, each picking sequence listing the products to be picked from the storage containers and which consolidation containers to place the products in within the timeframe, wherein each picking sequence is established by estimating at least one of the following:
   shortest travel distance for moving the picking device for picking from one storage container to picking from another storage container;
   fastest completion of picking from storage containers in the picking station for enabling new storage containers to enter the picking zone of the picking station; or
   fastest completion of the consolidation containers for replacing with new consolidation containers;
   e) ranking the picking sequences and selecting the picking sequence providing higher throughput of picked products according to ranked product orders; and
   f) executing picking of products by letting the picking system controller control the picking device to pick products from the storage containers and place them within the consolidation containers according to the selected picking sequence within the timeframe.

2. The method according to claim 1, wherein product orders with high priority are ranked higher than other orders.

3. The method according to claim 1, wherein the picking sequence is further established by estimating arrival time of next storage container entering the picking station and a position of the next storage container in the picking station.

4. The method according to claim 1, wherein the picking sequence is further established by checking if there are identical products listed in different product orders for picking identical products successively.

5. The method according to claim 1, wherein the picking sequence is further established by checking if different products listed in product orders are stored in storage containers positioned close to each other in the picking zone.

6. The method according to claim 1, wherein the picking sequence is further established by prioritizing completion of product orders with only a few remaining products to be picked.

7. The method according to claim 1, wherein the picking sequence is further established by estimating arrival time of next storage container to enter the picking zone and a position of the next storage container in the picking zone.

8. The method according to claim 1, wherein picking from storage containers with few products left is completed in preference to picking from storage containers with more products to allow new storage containers to enter the picking station.

9. The method according to claim 1, wherein buffer containers are used for temporary storing products from storage containers with few products left for faster replacements of storage containers.

10. The method according to claim 1, wherein camera vision is used for determining where in a specific storage container an identified product to be picked is positioned.

11. The method according to claim 10, wherein the picking device is controlled to target the identified product.

12. The method according to claim 1, wherein positions of storage containers and/or consolidation containers in the picking station are rearranged for providing minimal travel distance for the picking device.

13. A picking station of an automated storage and retrieval system, wherein the picking station is controlled by a picking system controller communicating with a warehouse management system and wherein picking is performed by a picking device placing picked products in one or more consolidation containers according to orders, wherein the picking system controller is adapted for controlling the picking device and picking station for executing a method comprising:

a) receiving and ranking product orders in the warehouse management system;

b) moving, by means of a transport system, storage containers with ordered products towards the picking zone according to the ranking of product orders;

c) checking which storage containers are available and ready to be picked from in the picking station and which storage containers and consolidation containers will be available within a timeframe, as well as determining a current position of the picking device relative to the positions of the at least one storage container that are ready to be picked from and the consolidation containers that are ready to receive the picked products;

d) establishing different picking sequences for completing each product order from the ranked product orders, each picking sequence listing the products to be picked from the storage containers and which consolidation containers to place the products in within the timeframe, wherein each picking sequence is established by estimating at least one of the following:

shortest travel distance for moving the picking device for picking from one storage container to picking from another storage container;

fastest completion of picking from storage containers in the picking station for enabling new storage containers to enter the picking zone of the picking station; or fastest completion of the consolidation containers for replacing with new consolidation containers;

e) ranking the picking sequences and selecting the picking sequence providing higher throughput of picked products according to ranked product orders; and f) executing picking of products by letting the picking system controller control the picking device to pick products from the storage containers and place them within the consolidation containers according to the selected picking sequence within the timeframe.

14. One or more computer-readable non-transitory storage media comprising a computer program product that, when executed by a processor in a picking system controller controlling a picking station of an automated storage and retrieval system, performs a method comprising:

a) receiving and ranking product orders in the warehouse management system;

b) moving, by means of a transport system, storage containers with ordered products towards the picking zone according to the ranking of product orders;

c) checking which storage containers are available and ready to be picked from in the picking station and which storage containers and consolidation containers will be available within a timeframe, as well as determining a current position of the picking device relative to the positions of the at least one storage container that are ready to be picked from and the consolidation containers that are ready to receive the picked products;

d) establishing different picking sequences for completing each product order from the ranked product orders, each picking sequence listing the products to be picked from the storage containers and which consolidation containers to place the products in within the timeframe, wherein each picking sequence is established by estimating at least one of the following:

shortest travel distance for moving the picking device for picking from one storage container to picking from another storage container;

fastest completion of picking from storage containers in the picking station for enabling new storage containers to enter the picking zone of the picking station; or fastest completion of the consolidation containers for replacing with new consolidation containers;

e) ranking the picking sequences and selecting the picking sequence providing higher throughput of picked products according to ranked product orders; and f) executing picking of products by letting the picking system controller control the picking device to pick products from the storage containers and place them within the consolidation containers according to the selected picking sequence within the timeframe.

\* \* \* \* \*